United States Patent [19]

Stewart

[11] Patent Number: 4,636,850
[45] Date of Patent: Jan. 13, 1987

[54] APPARATUS AND METHOD FOR ENHANCEMENT OF VIDEO IMAGES

[75] Inventor: Michael E. Stewart, Redwood City, Calif.

[73] Assignee: Adac Laboratories, Inc., San Jose, Calif.

[21] Appl. No.: 648,459

[22] Filed: Sep. 7, 1984

[51] Int. Cl.⁴ .............................................. H04N 5/32
[52] U.S. Cl. ....................................... 358/111; 378/99
[58] Field of Search ........................... 378/99; 358/111

[56] References Cited

U.S. PATENT DOCUMENTS

| 3,588,502 | 6/1971 | Greenfield | 358/111 |
| 4,204,225 | 5/1980 | Mistretta | 358/111 |
| 4,204,226 | 5/1980 | Mistretta et al. | 358/111 |
| 4,323,973 | 4/1982 | Greenfield | 358/111 |
| 4,335,427 | 6/1982 | Hunt et al. | 358/111 |
| 4,350,998 | 9/1982 | Verhoeven | 358/111 |
| 4,355,331 | 10/1982 | George et al. | 358/111 |
| 4,367,490 | 1/1983 | Riederer | 358/111 |
| 4,375,068 | 2/1983 | McBride | 358/111 |
| 4,393,402 | 7/1983 | Keyes et al. | 358/111 |
| 4,394,684 | 7/1983 | Verhoeven | 358/111 |
| 4,398,213 | 8/1983 | Haendle et al. | 358/111 |
| 4,399,457 | 8/1983 | Riederer et al. | 358/111 |

Primary Examiner—Craig E. Church
Assistant Examiner—David P. Porta
Attorney, Agent, or Firm—Fitch, Even, Tabin & Flannery

[57] ABSTRACT

An apparatus and method for producing digital video images provides for obtaining a first image (42) and a second image (44), and subtracting the first from the second to obtain a difference image (46). The intensity of the difference image is increased relative to the first image (48). The enhanced difference image is added to the first image (50). The result is an image which emphasizes changes between the first and second images, while preserving enough common background to provide a frame of reference from which to view the changes.

22 Claims, 2 Drawing Figures

APPARATUS AND METHOD FOR ENHANCEMENT OF VIDEO IMAGES

The present invention relates generally to X-ray video imaging and more particularly to a novel apparatus and method for selectively highlighting portions of the video image against the background of the image.

BACKGROUND OF THE INVENTION

In X-ray video images of an anatomical subject, the anatomy of primary diagnostic interest may be surrounded, overlayed or underlayed by bone or other tissue which obscures or prevents visualization of the anatomy of interest. As is conventional in the art, where two images of the same region of an anatomical subject contain both obscuring structures and structures which change in shape or other characteristic from one image to the next, a subtraction of one image from the other will create a difference image. This difference image enhances the detectability and visibility of the anatomy of interest since the obscuring structures have either been removed or suppressed as a result of the subtraction.

In X-ray angiography, for example, a number of devices are presently available which perform this subtraction technique. In such systems, a fluoroscopic X-ray video image of the anatomy of interest is first obtained. The video image is digitized and the resultant digital words, corresponding to individual pixel values of the image, are stored in an image store memory. Shortly after the first video image is obtained, an X-ray opaque dye, such as an iodine compound, is injected into a blood vessel to cause the blood vessels in the area of interest to be enhanced. One or more subsequent X-ray video images are obtained and digitized in the same manner as the first video image. The digital words, or pixel values, of the subsequent image or images are stored in one or more second image store memories. By subtracting digital pixel values of the first image (a mask image) from the corresponding digital pixel values of the subsequent images, resultant difference images are obtained. These difference images can be converted to an analog video signal which drives a video monitor so that the resultant difference image may be displayed. In these difference images, the dye path is highly contrasted from the background, and most background anatomical landmarks are removed. A typical digital X-ray image subtraction system, as hereinabove described, is disclosed in U.S. Pat. No. 4,399,457.

A disadvantage and limitation of known image subtraction systems is that the important anatomical landmarks in the background are obscured to such an extent during the subtraction that it is difficult if not impossible to discern the position of an enhanced blood vessel with respect to such background structures. Also, should the background anatomy move between taking the first and second X-ray images, the background anatomy is not subtracted out but is blurred in the resultant subtracted image.

One prior art system that provides a difference image of the anatomy of interest which is displayed with the background anatomical landmarks is disclosed in U.S. Pat. No. 4,398,213. In this system, an X-ray video image is taken prior to injection of the dye and is stored as a mask image in a first image store. After injection of the dye, the digitized pixel values of the image stored in the first or mask image and the corresponding digitized pixel values of the current image are successively applied to a subtractor to obtain the difference image, as described above. The output pixels of the subtractor for each image, however, are all stored in a single second image store, i.e. these pixel values are added on top of previous pixel values so that the resultant second image includes the entire path of the dye. The image stored in the first image store (the image without dye contrast media) and the resultant image stored in the second image store are lastly added to each other and the result displayed on a video monitor. Thus, the path of the dye is shown along with anatomical landmarks.

The significant disadvantage and limitation of the prior art system described above is that the summing of the subtracted pixel values during the dye injection procedure causes an uneven dye path intensity to be developed in the resultant video image. For example, a portion of the image containing dye throughout most of the injection procedure would have a significantly larger number of additions performed to the corresponding pixel values, i.e., a greater amplification of these pixels, than the portions of the image having the dye component for a relatively short time. Thus, the enhancement of the dye portion in the resultant image varies as a function of the time the dye had remained in each area of the image. This unevenness in the enhancement of the dye portion may adversely effect the usefulness of obscure blood vessel structures or otherwise the resultant x-ray video image as a diagnostic tool.

SUMMARY OF THE INVENTION

It is therefore an important object of the present invention to overcome one or more of the disadvantages and limitations above described.

It is a primary object of the present invention to provide a novel method and apparatus which uniformly enhances the dye portion of X-ray video images with respect to other anatomical structures appearing in the image.

A further object of the present invention is to provide, in general, a novel method and apparatus for enhancing the display of moving structures in video images with respect to background or non-moving structures in such images.

According to one embodiment of the present invention, a first video image and a subsequent second video image of an anatomical subject are obtained. The first video image is subtracted from the second image to obtain a difference image. The difference image is multiplied by a predetermined amount and then summed with either of the first image or the second image. The resultant video image, when displayed on a video monitor, will have the differences between the first and second images highlighted against the non-varying background of the image.

The first and second video images may be digitized and stored in a first and second video image store memory, respectively. Each digital word in the image corresponds in a conventional manner to a pixel value in the image. Each digital word of the first image is subtracted from the corresponding digital word of the second image. Each difference digital word is stored in an intermediate image store. The digital words in the intermediate image are then each multiplied by a scalar. The resultant digital words are then added to the corresponding digital words of either the first or second video image to create a summed image. The summed image is converted to an analog video signal which may then drive a video monitor to display the resultant video image.

In X-ray angiography, an X-ray opaque dye is injected into the anatomical subject prior to developing the second image. The pixel values of the intermediate image will then have non-zero representations which correspond only to the dye portion of the image. Multiplication of the intermediate image has the effect of increasing the intensity of the pixel values corresponding to the dye portion. When the scaled intermediate image is summed with either the first or second image, the pixel values of the dye component will have a greater intensity than the background pixel values so that the dye component is highly contrasted from the background in the resultant video image.

In another embodiment of the present invention, an image is developed for each frame in a plurality of successive frames. Each image is subtracted from the next successive image. Each intermediate image from the subtraction is then multiplied and summed with one or the other of the images used in the subtraction. The succession of resultant images after summing, when converted to a video signal and displayed on a monitor, will provide a video image useful for studying moving anatomy with or without the need for injection of a dye.

Other advantages, objects and features of the present invention will become more apparent to those skilled in the art from the following description when read in conjunction with the attached drawings, and the appended claims.

DETAILED DESCRIPTION OF THE DRAWINGS

Figure 1:
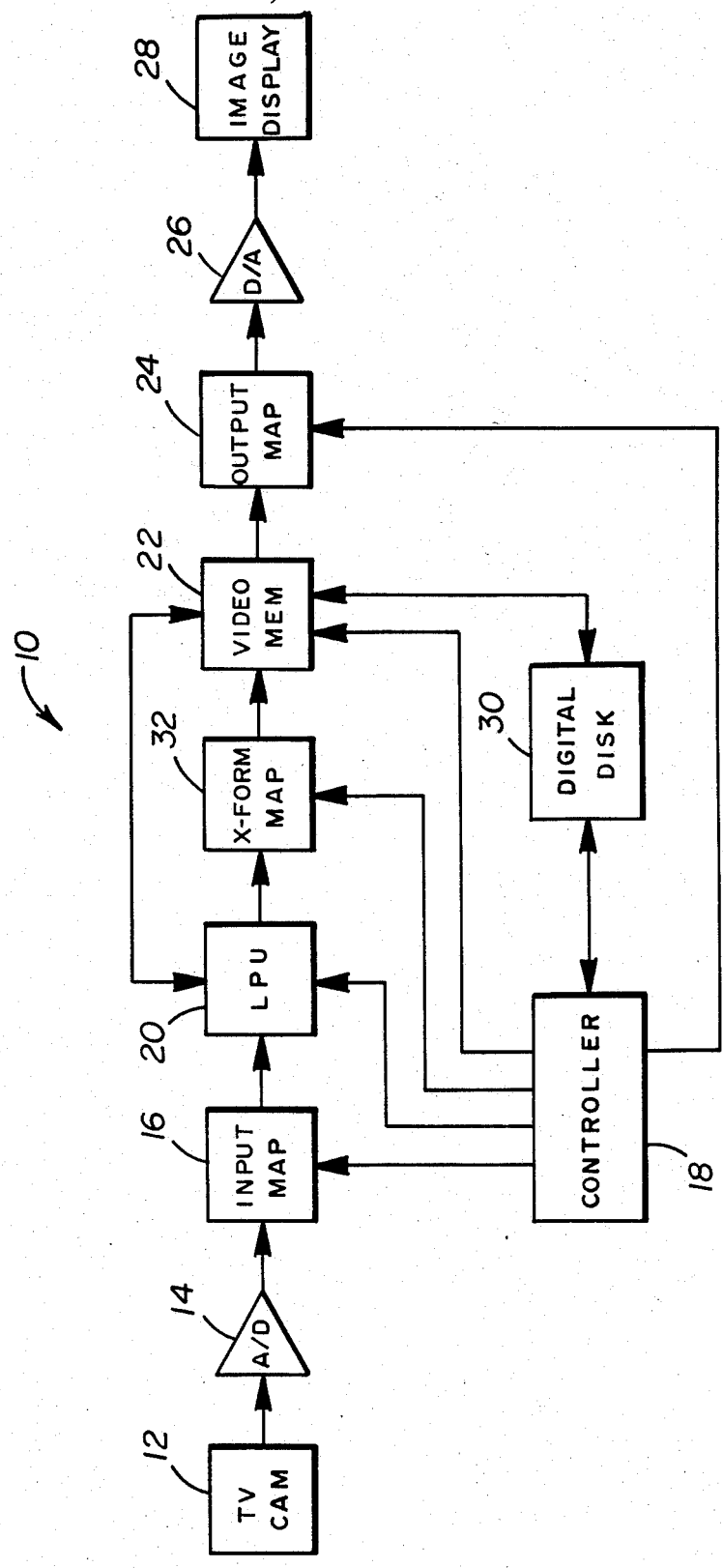
FIG. 1 is a schematic block diagram of an apparatus for processing video images according to the principles of the present invention.

Referring now to FIG. 1, there is shown an apparatus 10 for producing digital video images according to the principles of the present invention. Apparatus 10 includes a television camera 12 for converting a visible X-ray image into a continuous series of television fields. Camera 12 develops a succession of analog video signals, each analog signal corresponding to one of the succession of video fields. Not shown is conventional apparatus for developing the visible X-ray image which is scanned by camera 12. The X-ray image may be developed from a source of X-rays, arranged to propagate the X-ray through an anatomical subject. The X-rays are then collected by a conventional image intensifier which produces a visible anatomical image corresponding to the X-ray image. Camera 12 is responsive to the visible anatomical image corresponding to the X-ray image. Alternatively, camera 12 may also include the image intensifier so as to be directly responsive to the X-ray radiation passing through the anatomical subject to develop the succession of analog video signals.

The analog video signal developed during each frame by camera 12 is applied to an analog digital converter 14. A/D converter 14 digitizes the analog video signal into a plurality of digital words. Each of the digital words correspond to a pixel value in the video image of each field. Each digital word developed by A/D converter 14 is applied to an input map 16 which predeterminedly scales the value of each pixel. Input map 16 is a conventional look-up table which substitutes a predetermined pixel value for the actual pixel value applied thereto. Input map 16 provides a logarithmic mapping of the pixel values to compensate for the exponential nature of the intensity of electromagnetic radiation of the function on the thickness of the anatomical subject.

A controller 18, which may be a general purpose CPU, is programmed to control input map 16 in a conventional manner. Flowcharts useful for programming controller 18, according to the present invention, are described hereinbelow with reference to FIG. 2. The digital pixel values developed by input map 16 are applied to a line processor unit (LPU) 20. LPU 20, in one embodiment of the present invention, is an array processor under control of controller 18. LPU 20 provides the mathematical functions, as hereinbelow described, which act on the digital pixel values. After each line of digital pixel values is loaded into LPU 20, controller 18 causes such line to be operated from LPU 20 into a video memory 22. Video memory 22 is of sufficient size to store several digital images in image storage. As hereinbelow described, LPU 20 will perform mathematical operation on each pixel stored in video memory 22 from either the current pixel being outputted from input map 16 or from another corresponding pixel of a second image store in video memory 22.

To display a stored image, the image store and video memory 22 is output to an output map 24. Output map 24 is also controlled by controller 18 and provides a user interface for adjusting the pixel value or intensity of the image. The digital pixel from output map 24 are applied to a digital to analog (D/A) converter 26 to develop an analog video signal. The analog video signal may then drive a suitable means 28 for displaying the image, such as a conventional TV monitor.

Processing of images may be performed in real time or may be subsequently processed after acquiring. For example, images stored in an image store memory of video memory 22 may be stored on a digital disk 30, under control of controller 18. Alternatively, images heretofore stored on digital disk 30 may be applied to an appropriate image store in video memory 22 for processing.

Coupled intermediate between LPU 20 and video memory 22 is a transformation map 32 which in one embodiment of the present invention, is a look-up table which substitutes each pixel in the the current line with a value determined by the value of the pixel. Alternatively, the multiplication could be performed by multiplying each pixel by a scalar in LPU 20 under control of controller 18. However, a lock-up table or transformation map 32 is preferred for real time applications of apparatus 10.

Figure 2:
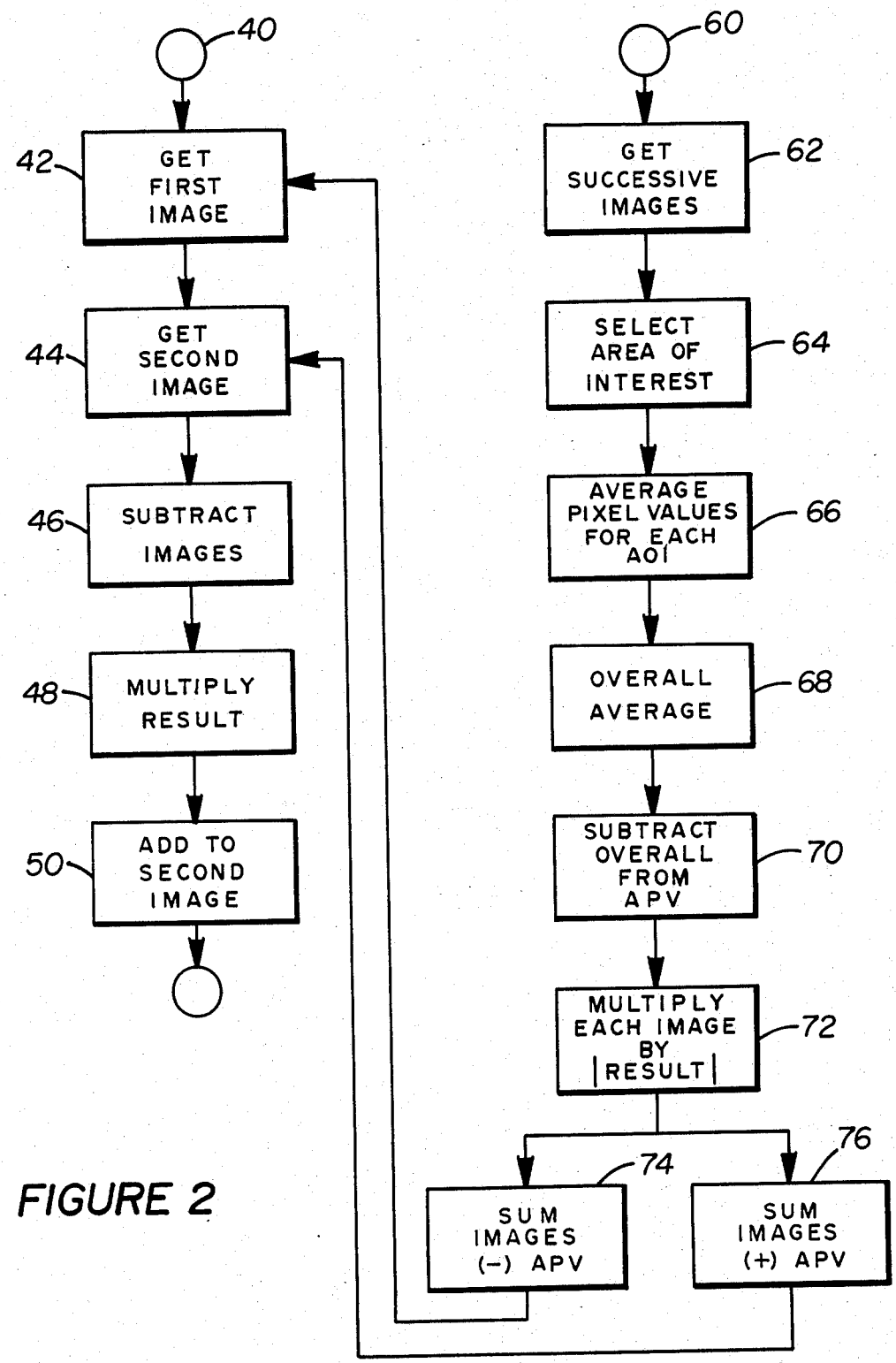
FIG. 2 is a flow chart useful in describing the operation of the apparatus of FIG. 1.

Referring now to FIG. 2, there is shown a first flow chart 40 illustrating the steps of one embodiment of the present invention. At 42 it is indicated that a first image is obtained. The first image may be obtained either from TV camera 12 and stored in a first image store of video memory 22, as hereinabove described, obtained from digital disk 30 and stored in the first image store of video memory 22, or already be resident within first image store of video memory 22. At 44 it is indicated that a second image is obtained. Usually, the second image is obtained after the anatomical subject has been injected with an X-ray opaque contrast medium, such as an iodine dye. Similarly, the second image may be obtained either from TV camera 12 or digital disk 30 or already be resident in a second image store of video memory 22.

At 46 it is indicated that the first and second images are subtracted from each other. Usually, the first image becomes a mask which is subtracted from the second image. In real time applications, controller 18 will cause successive lines to be addressed in the first image store of video memory 22 and applied to LPU 20 concurrently with corresponding lines of the second image being developed by TV camera 12, AD converter 14 and input map 16, as hereinabove described. LPU 20 then subtracts the mask pixel from the corresponding pixel of the second image. If the second image is already stored in a second image store of video memory 22, controller 18 causes corresponding lines from the first image stored and second image stored to be addressed and applied to LPU 20 which will perform the subtraction as hereinabove described. After the subtraction is performed, the subtracted digital words or pixels are stored in an intermediate image store of video memory 22. The intermediate image will ideally only contain information of the differences existing between the first and second images.

At 48 it is indicated that the intensity of the intermediate image is increased by multiplying each digital word or pixel value thereof. Under control of controller 18, the intermediate image store of video memory 22 is addressed for application to LPU 20. Each pixel is then multiplied by a scalar by performing a mathematical operation in LPU 20 or, in the preferred embodiment of the present invention, by substituting the present value of a pixel by mapping such values to transformation map 32 which provides a new value for such pixel. The multiplied pixel is then added to the corresponding pixel of the second image store in video memory 22 as indicated at 50. The added pixels are stored in resultant image store in video memory 22. The resultant image store may further be stored on digitial disk 30 for archiving and presently displayed on image display 28 as hereinabove described. In the resultant image, the differences between the first image and the second image are highlighted amongst the background.

The images stored in the various image stores of video memory 22 may be developed either from a single frame of the video signal developed by TV camera 12 or from the average of a plurality of frames thereof. The averaging of a plurality of frames reduces signal-to-noise ratio as is known in the art.

In an alternative embodiment of the present invention, the steps indicated by flow chart 40 are repeated for successive images. For example, in a plurality of successive images, the immediately preceding image becomes the mask image for the present image which is subtracted as indicated at 46. The subtracted image is multiplied and added with the present image. Subsequently, the present image then becomes the mask for the next subsequent image and the subtraction and multiplication process is repeated generally for each successive image. Thus, the differences between adjacent images become highlighted in the succession of resultant images so that moving anatomy may be displayed on image display 28 without the need for the injection of dye. However, this procedure is also useful when dye is injected.

At 60, there is indicated a second flow chart illustrating the steps of yet another embodiment of the present invention. At 62, it is indicated that a plurality of successive images are obtained and stored in successive image stores of video memory 22. Each successive image may either be a single frame or an average of a plurality of frames. At 64, it is indicated that an area of interest is selected in each image, the area of interest being common to each image.

At 66, it is indicated that for the area of interest in each of the successive images, the pixels within such area are averaged. Thus, an average pixel value is developed for each successive image. The area of interest may be established by a user interface with controller 18 which is known in the art.

At 68, it is indicated that each of the average pixel values associated with each image, are averaged together to obtain an overall average pixel value or a DC pixel level. The DC level is subtracted from the average pixel value associated with each of the successive images as indicated at 70 to obtain a coefficient associated with each of the images.

At 72, it is indicated that all pixels in each successive image are multiplied by the absolute value of the coefficient associated with each successive image of the steps performed at 70. After each successive image is multiplied by the coefficient associated therewith, each of the images having a negative coefficient are summed together, as indicated at 74 and each of the images having a positive coefficient are summed together as indicated at 76. Further processing of the images is identical to the process described with reference to flowchart 40. The sum of the negatively weighted images 74 becomes the first image at 42, and the sum of the positively weighted images 76 becomes the second image at 44. Subtraction, multiplication and addition is performed as described at 46, 48 and 50, to obtain a resultant image wherein selected portions, such as a dye component, are highlighted among anatomical landmarks.

There has been described novel methods and apparatus for enhancing video images. It will be apparent that modification to and variations of the above-described preferred embodiments may be made by those skilled in the art without departing from the teachings of the present invention which is defined solely by the scope of the appended claims.

What is claimed is:

1. An apparatus for enhancing video images of a subject comprising:
    means for obtaining a first image of said subject, and for subsequently obtaining a second image of said subject;
    means for subtracting one of said first image and said second image from the other of said first image and said second image to obtain an intermediate difference image;
    transformation mapping means for increasing the intensity of said difference image by applying a monotonically increasing pixel to pixel intensity transformation to said difference image; and
    means for adding said increased intensity difference image to one of said first image and said second image to obtain a resultant image wherein the difference is between said first image and said second image are highlight in said resultant image when displayed on a video monitor.

2. An apparatus as set forth in claim 1 wherein said obtaining means includes:
    means responsive to electromagnetic radiation directed through said subject for periodically developing a video signal for at least one frame of each of said first image and said second image;

means for digitizing each said video signal to develop a plurality of digital words for each frame, each one of said words corresponding to a pixel in the video raster; and means for storing said digtial words in an image store memory.

3. An apparatus as set forth in claim 2 wherein said digital words for each of said first image and said second image are obtained from an average of a plurality of frames of said first image and said second image, respectively.

4. An apparatus as set forth in claim 2 wherein said subtracting means includes:

means for subtracting each digital word of said first image from the corresponding digital word of said second image;

and means for storing each subtracted digital word in said image store memory to form an intermediate image.

5. An apparatus as set forth in claim 4 wherein said transformation mopping means comprises multiplying means for multiplying each subtracted digital word by a scalar.

6. An apparatus as set forth in claim 4 wherein said transformation mopping means includes a transformation map; and means for substituting each digital word of said intermediate mask with a digital word from said transformation map, the digital word from said transfer map being selected as a function of the value of said digital word of said intermediate difference image.

7. A method for enhancing video images of a subject comprising:

obtaining a first image and a subsequent second image of said subject;

subtracting one of said first image and said second image from the other of said first image and said second image to obtain an intermediate difference image;

increasing the intensity of said difference image by applying a monotonically increasing pixel to pixel intensity transformation to said difference image; and adding said increased intensity difference image to one of said first image and said second image to obtain a resultant image wherein the differences between said first image and said second image are highlighted in said resultant image when displayed on a video monitor.

8. A method as set forth in claim 7 wherein said obtaining step includes:

developing a video signal for at least one frame of each of said first image and said second image in response to electromagnetic radiation being directed through said subject;

digitizing each said video signal to develop a plurality of digital words, each one of said words corresponding to a pixel in the raster of said video image; and storing said digital words in an image store memory.

9. A method as set forth in claim 8 which further includes averaging a plurality of frames of said first image and averaging a plurality of frames of said second image to obtain a plurality of average digital words; and storing said average digital words in said image store for memory each of said first image and said second image.

10. A method as set forth in claim 8 wherein said subtracting step includes:

subtracting each digital word of said first image from the corresponding digital word of said second image; and storing each subtracted digital word in said image store memory to form an intermediate difference image.

11. A method as set forth in claim 10 wherein said increasing step includes multiplying each subtracted digital word by a scalar.

12. A method as set forth in claim 10 wherein said increasing step includes:

providing a transform map; and substituting each digital word of said intermediate difference image with a digital word from said transform map, said digital word from said transform map being selected as a function of the value of said digital word from said intermediate difference image.

13. An apparatus for enhancing video X-ray images of an anatomical subject comprising:

means responsive to X-ray radiation passing through said subject to develop a first video signal for at least one frame and a second video signal for at least one subsequent frame;

means for digitizing said first video signal and said second video signal into a plurality of digital words, each digital word corresponding to a pixel value;

means for storing said digital words obtained from said first video signal in an image store memory;

means for subtracting said stored digital words from the corresponding digital words obtained from said second video signal to obtain a plurality of subtracted digital words;

means for multiplying each of said subtracted digital words by a scalar;

means for adding each of said multiplied digital words to the corresponding one of said stored digital words;

means for converting said added digital words to an output analog video signal; and means responsive to said output video signal for displaying a resultant video image.

14. An apparatus as set forth in claim 13 wherein an X-ray opaque dye is injected into said subject prior to developing said second video signal, the differences between said first video signal and said second video signal due to said dye are highlighted in said resultant video image.

15. An apparatus as set forth in claim 13 wherein said multiplying means includes a transformation map, each of said digital words of said intermediate mask being exchanged for a digital word from said map, said map digital word being selected as a function of the value of the present digital word of said intermediate difference image.

16. An apparatus as set forth in claim 13 wherein said apparatus further includes:

input map means for preselectively scaling said digital words developed by said digitizing means.

17. An apparatus as set forth in claim 16 wherein said input map means includes means for logarithmically amplifying said digital words.

18. An apparatus as set forth in claim 13 wherein said apparatus further includes:

output map means for preselectively scaling said digital words prior to being converted to an output video signal.

19. An apparatus for enhancing video X-ray images of an anatomical subject comprising:
   means for obtaining a plurality of successive images of said subject;
   means for subtracting each of said images from one of the next successive ones of said images to obtain a difference image;
   means for increasing the intensity of each said difference image; and
   means for adding each said increased intensity difference image to said next successive one of said images to obtain a resultant image wherein the differences between successive video images are highlighted when each said resultant image is successively displayed on a video monitor.

20. An apparatus for enhancing video images comprising:
   means for obtaining a plurality of successive images of a subject;
   means for averaging the pixel values within a selected area of each of said images to obtain an average pixel value for each of said images;
   means for averaging each said average pixel value with each other to obtain a DC pixel value;
   means for subtracting said DC pixel value from each said average pixel value to obtain a coefficient associated with each of said images;
   means for increasing the intensity of all pixels in each of said images by the absolute value of the coefficient associated therewith;
   means for summing all increased intensity images having negative coefficients with each other to obtain a first image and for summing all increased intensity images having positive coefficients with each other to obtain a second image;
   means for subtracting said first image from said second image to obtain an intermediate difference image;
   means for increasing the intensity of said intermediate difference image; and
   means for adding said increased intensity intermediate image to one of said first image and said second image to obtain a resultant image wherein differences between said successive images are highlighted.

21. An apparatus for enhancing video images of a subject comprising:
   means for obtaining a subtrahend image and a minuend image;
   means for subtracting said subtrahend image from said minuend image to obtain a difference image;
   transform means for transforming at least one of said difference image and said subtrahend image so that the difference between the intensity distribution of said difference image and the intensity distribution of said subtrahend image after transformation is a monotonically increasing pixel-to-pixel transform of the difference between the intensity distribution of said difference image and the intensity distribution of said subtrahend image before transformation, and so that the difference between the average intensity of said difference image and the average intensity of said subtrahend image is greater after transformation than before transformation; and
   means for adding after transformation said subtrahend image to said difference image.

22. A method for enhancing video images of a subject comprising:
   obtaining a subtrahend image and a minuend image;
   subtracting said subtrahend image from said minuend image to obtain an intermediate difference image;
   transforming at least one of said difference image and said subtrahend image so that the difference between the intensity distibution of said difference image and the intensity distribution of said subtrahend image after transformation is a monotonically increasing pixel-to-pixel transform of the difference between the intensity distribution of said difference image and the intensity distribution of said subtrahend image before transformation, and so that the difference between the average intensity of said difference image and the average intensity of said subtrahend image is greater after transformation than before transformation; and
   after said transformation, adding said subtrahend image to said difference image.

* * * * *